Patented Apr. 5, 1938

2,113,092

UNITED STATES PATENT OFFICE 2,113,092

MANUFACTURE OF DIBENZYL DISULPHIDE

Robert C. Moran, Wenonah, and George S. Crandall, Woodbury, N. J., assignors to Socony-Vacuum Oil Company, Incorporated, New York, N. Y., a corporation of New York No Drawing. Application September 21, 1935, Serial No. 41,554. Renewed December 9, 1936

8 Claims. (Cl. 260—16)

This invention is directed to an improved method for the commercial synthesis of dibenzyl disulphide. Dibenzyl disulphide is used in the arts as an antioxidant in rubber compounding, stabilization of petroleum fractions, and the like.

Present methods of preparation of this compound are expensive and time-consuming, being mostly laboratory type operations carried out upon a somewhat enlarged scale, and the resulting product is so high in cost that it is prevented from entering into wide use, even though usually used in quite small proportions.

Various methods of preparation may be found in the literature, the usual ones and references pertinent thereto being as follows:

(a) *From benzal chloride*

| | | |
|---|---|---|
| Blanksma Rev. trav. chim. | 20 | 137 |
| Märcker Ann. | 136 | 87 |

(b) *From benzal chloride*

| | | |
|---|---|---|
| Cahours Ann. | 70 | 40 |
| Fleischer Ann. | 140 | 234 |
| Schmoldt Ber. | 40 | 2870 |

(c) *From benzal mercaptan*

| | | |
|---|---|---|
| Märcker Ann. | 136 | 86 |
| Märcker Ann. | 140 | 86 |
| Smythe & Forster—J. Chem. Soc. | 97 | 1195 |

(d) *From sodium benzal thiosulphate*

| | | |
|---|---|---|
| Price-Twiss J. Chem. Soc. | 91 | 2026 |
| Price-Twiss J. Chem. Soc. | 93 | 1399 |
| Price-Twiss J. Chem. Soc. | 95 | 1490 |

Of the methods above set forth, the one most feasible and most usually used is the reaction of benzyl chloride with sodium sulphide plus sulphur, carried out in a homogeneous reaction mixture in alcoholic solution, as studied by Blanksma and Märcker. (See "a" above.) In this method of preparation the reaction ingredients are brought together in alcoholic solution, and reaction is carried out at elevated temperatures for several hours, with stirring, under a reflux column. After reaction, the reaction mixture is cooled and the dibenzyl disulphide product is obtained by repeated crystallization. A very extensive washing of the several crops of crystals, first with increasingly dilute alcoholic solutions and finally with water is required in order to secure a product of the purity required for even technical uses. After this, the entire bulk of the alcoholic solutions must be redistilled to recover the alcohol and residual reagents for reuse in the process. The preparation after this method is highly time-consuming, wasteful of reagents, prone to high solvent losses, and incapable of conveniently yielding a product of even a high degree of technical purity.

An object of this invention is to provide a method whereby dibenzyl disulphide may be manufactured in commercial quantities of a high degree of purity without excessive loss of solvents and reagents and without complicated processing in equipment of ordinary type, such as iron equipment. Other objects are in part obvious, and in part may be hereinafter disclosed.

We have found that these objects may be attained by the condensation of benzyl chloride with sodium sulphide plus sulphur in a system comprising non-homogeneous solutions in a manner hereinafter described.

The non-homogeneous system we make use of consists of two immiscible phases, one of which is the benzyl chloride, with or without a solvent liquid capable of dissolving dibenzyl disulphide, and the other of which is an aqueous solution of sodium sulphide plus sulphur.

For the solvent phase, any solvent may be used which exhibits the characteristic of solvent power for dibenzyl disulphide, in combination with other properties as follows:

1. Solvent power for dibenzyl disulphide preferably greater when hot than when cold.
2. Inertness to the reagents employed.
3. Practically immiscible with water.

As examples of the solvents which may be used successfully, we may name benzol, toluol, xylol, normal amyl alcohol, n-butyl alcohol, n-hexyl alcohol, cyclohexyl alcohol, n-butyl ether, and petroleum fractions of the nature of Stoddard solvent, which is a naphtha boiling between the ranges of 300° F. and 400° F. In the following example of procedure, the use of benzol is described.

The improved process consists of agitating, at about 50° C. to 80° C., or preferably such a temperature as will bring about boiling of the benzol in the mixture, a non-homogeneous reaction mixture comprising a solution of benzyl chloride in benzol and one of sodium sulphide plus free sulphur in water. The vessel in which this is carried out is equipped with a reflux column, so that vapors of benzol may be condensed and returned to the system. After reaction for about one hour, agitation is stopped, and the charge settles and separates readily. The aqueous layer is drawn off, and the benzol layer is removed and filtered hot, to separate from it contaminants which are insoluble in the hot solution, after which it is cooled to a temperature near atmospheric and filtered to remove the separated crystalline product. After drying, the crystalline dibenzyl disulphide thus recovered will be found to have a melting point of 67 to 69° C. and to be sufficiently pure for technical use. The filtrate recovered is returned to the next batch as solvent for the benzyl chloride; whatever fresh benzol makeup being necessary representing the unavoidable losses in the carrying out of the process. Operating in this fashion the yield of dibenzyl disulphide is 90% of the theoretical or better.

The following is an illustration of the improved process:

Into the reaction vessel, provided with a reflux condenser and suitable agitation, are charged the following materials, given in parts by weight:

| | Parts |
|---|---|
| Benzyl chloride | 5.2 |
| Benzol | 4.9 |
| Sodium sulphide | 7.6 |
| Sulphur | 1.0 |
| Water | 12.9 |

The sodium sulphide, sulphur and water are added first, and solution obtained by agitation with warming. The benzol solution of benzyl chloride is then added gradually with agitation. The reaction mixture is heated to about 80° C. when refluxing starts. After maintaining this temperature and active agitation for about one hour, the charge is allowed to separate, the lower aqueous layer drawn off and the upper layer run off to a suitable vessel for precipitation of the dibenzyl disulphide on cooling. After filtration, the dibenzyl disulphide is thoroughly dried at about 50° C. and is then satisfactory for technical use. The filtrate is used in the next charge, with whatever addition of fresh benzol is necessary in accord with the above weight proportions, as reaction medium.

The yield of dibenzyl disulphide thus obtained by single crystallization in cooling the benzol layer to room temperature, where fresh benzol entirely is used in the reaction mixture, is about 2.5 parts by weight or about 50% of the theoretical. By repeated recrystallization about 2.3 parts more can be obtained. We prefer, however, to operate differently and avoid these repeated recrystallizations by returning the filtrate from the first crystallization to the next reaction mixture charge as solvent for the benzyl chloride. Operating in this manner, the yield of dibenzyl disulphide from a single crystallization amounts to 4.8 parts by weight or better (90% or better of theory).

The following is a summary of materials requirements in parts per part of dibenzyl disulphide (95.2% yield) in comparison with those of the prior art using alcohol as reaction medium (81.5% yield).

From this tabulation it appears that a given reaction vessel will have about three times the production capacity by the improved process as compared with prior art using alcohol as reaction medium.

| | Improved process | | Prior art | |
|---|---|---|---|---|
| | By weight | By volume | By weight | By volume |
| | Lbs. | Gals. | Lbs. | Gals. |
| Reaction mixture: | | | | |
| Benzyl chloride | 1.09 | 0.12 | 1.27 | 0.13 |
| Alcohol, ethyl, as 95% | None | None | 10.68 | 1.63 |
| Benzol | 1.03 | 0.14 | None | None |
| Sodium sulphide | 1.60 | | 1.91 | |
| Sulphur | 0.21 | | 0.24 | |
| Water | 2.71 | 0.31 | | |
| Total parts per part dibenzyl disulphide | 6.64 | 0.57 | 14.10 | 1.76 |
| Purification: | | | | |
| Alcohol, ethyl, as 95% water | None required | None required | 4.72 | 0.72 |
| | | | 10.78 | 1.30 |
| Total parts per part dibenzyl disulphide | | | 15.50 | 2.02 |
| Grand total per part dibenzyl disulphide | 6.64 | 0.57 | 29.60 | 3.78 |

As compared with prior practice, using 95% alcohol as the reaction medium, the improved process disclosed herein has the following advantages:

(a) Production capacity of a given reaction vessel is increased three-fold or more.

(b) Saving in time due to the fact that sodium sulphide dissolves readily in water but not alcohol.

(c) Further saving in time, materials and equipment since the crude product from the improved process requires no further purification.

(d) Decided saving in solvent and equipment cost since the benzol reaction medium is used over and over again without redistillation. This is not possible with the alcohol process. Therefore, the solvent cost will be that of the make-up representing unavoidable benzol losses in the operation of the process.

With respect to large-scale production, the improved process can be carried out in ordinary iron apparatus, and no distillation equipment is required for the recovery of solvent medium; the solvent from the preceding run, after a single crystallization of dibenzyl disulphide therefrom, being used as reaction medium. In other words, the solvent medium in each run after the first is benzol saturated at about room temperature with dibenzyl disulphide. As compared with prior art, the improved process about triples the capacity of a given apparatus and at the same time reduces the reaction materials costs per pound of dibenzyl disulphide about 50%.

With respect to the use of solvents other than benzol, the following may be noted: The same procedure is used with these solvents as with benzol. The reaction temperature is the boiling point of the heterogeneous mixture. The proportion of solvent used may be varied over a wide range. The lower limit is dependent on the ability to handle the highly concentrated hot solutions of dibenzyl disulphide, and the upper limit is dependent on convenience of handling large quantities of solvent. By continuous operation the solvent becomes saturated with the dibenzyl disulphide at the crystallization temperature and is reused successfully. In practice 1.2 to 1.7 volumes of solvent were mixed with 1 volume of benzyl chloride.

The reaction may also be carried out in the absence of an organic solvent at approximately the boiling temperature of the mixture; the dibenzyl disulphide being subsequently extracted from the reaction mixture with a water immiscible organic solvent, such as one of those mentioned above or a halogenated organic compound such as carbon tetrachloride, chloroform, ethylene dichloride or any chlorinated organic compound of low mutual water solubility and good solvent power toward dibenzyl disulphide.

The following variations of the method are exemplary of those that have been found to be effective as a method of commercial preparation:

| Solvents | Yield | Ratio vol. solvent / Vol. benzyl chloride |
|---|---|---|
| | Percent | |
| Hydrocarbons | | |
| Benzene | 95.2 | 1.1 |
| Xylene | 81.4 | 1.1 |
| Naphtha (Stoddard solvent) | 93.5 | 1.1 |
| Alcohols: | | |
| n-Amyl alcohol | 83.5 | 1.1 |
| No solvent | 91.9 | |

We claim:

1. That process for the manufacture of dibenzyl disulphide which comprises the steps of reacting a non-homogeneous system composed of benzyl chloride, a water solution of sodium sulphide containing excess sulphur, and a solvent capable of dissolving dibenzyl disulphide, which solvent is not substantially miscible with water, conducting said reaction at elevated temperature with agitation until completion of the reaction, separating the phases, cooling the solvent to precipitate dibenzyl disulphide therefrom, and recovering the precipitate.

2. That process for the manufacture of dibenzyl disulphide which comprises the steps of reacting a non-homogeneous system composed of benzyl chloride, a water solution of sodium sulphide containing excess sulphur, and a solvent chosen from the group consisting of benzol, xylol, toluol, n-butyl alcohol, n-hexyl alcohol, cyclohexyl alcohol, n-butyl ether, normal amyl alcohol, and petroleum naphthas, conducting said reaction at elevated temperatures with agitation until completion of the reaction, separating the phases, cooling the solvent to precipitate dibenzyl disulphide therefrom, and recovering the precipitate.

3. That process for the manufacture of dibenzyl disulphide which comprises the steps of reacting a non-homogeneous system composed of benzyl chloride, a water solution of sodium sulphide containing excess sulphur, and a solvent capable of dissolving dibenzyl disulphide, which solvent is not substantially miscible with water, conducting said reaction at a temperature upwards of 50° C. with agitation until completion of the reaction, separating the phases, cooling the solvent to precipitate dibenzyl disulphide therefrom, and recovering the precipitate.

4. That process for the manufacture of dibenzyl disulphide which comprises the steps of reacting a non-homogeneous system composed of benzyl chloride, a water solution of sodium sulphide containing excess sulphur, and a solvent capable of dissolving dibenzyl disulphide, which solvent is not substantially miscible with water, conducting said reaction at a temperature upwards of 50° C. with agitation until completion of the reaction, while refluxing vaporized solvent to the reaction mixture, separating the phases, cooling the solvent to precipitate dibenzyl disulphide therefrom, and recovering the precipitate.

5. That process for the manufacture of dibenzyl disulphide which comprises the steps of reacting a non-homogeneous system composed of benzyl chloride and a water solution of sodium sulphide containing excess sulphur, conducting said reaction at elevated temperature with agitation until completion of the reaction, separating the phases, and recovering the product from the non-aqueous phase.

6. That process for the manufacture of dibenzyl disulphide which comprises the steps of reacting a non-homogeneous system composed of benzyl chloride and an aqueous solution of sodium sulphide containing excess sulphur, conducting the reaction at elevated temperature with agitation until completion of the reaction, extracting the dibenzyl disulphide from the reaction mixture with a solvent which is not substantially miscible with water, and recovering the dibenzyl disulphide from the solvent.

7. That process for the manufacture of dibenzyl disulphide which comprises the steps of reacting a non-homogeneous system composed of benzyl chloride and an aqueous solution of sodium sulphide containing excess sulphur, conducting the reaction at elevated temperature with agitation until completion of the reaction, extracting the dibenzyl disulphide from the reaction mixture with a solvent chosen from the group consisting of benzol, xylol, toluol, n-butyl alcohol, carbon tetrachloride, chloroform, ethylene dichloride, n-butyl ether, normal amyl alcohol, and petroleum naphthas, and recovering dibenzyl disulphide from the solvent.

8. That process for the manufacture of dibenzyl disulphide which comprises the steps of reacting a non-homogeneous system composed of benzyl chloride and an aqueous solution of sodium sulphide containing excess sulphur, conducting said reaction at a temperature upwards of 50° C. with agitation until completion of the reaction, extracting the dibenzyl disulphide from the reaction mixture with a solvent which is not substantially miscible with water, and recovering the dibenzyl disulphide from the solvent.

ROBERT C. MORAN.
GEORGE S. CRANDALL.

---

CERTIFICATE OF CORRECTION.

Patent No. 2,113,092.      April 5, 1938.

ROBERT C. MORAN, ET AL.

It is hereby certified that error appears in the printed specification of the above numbered patent requiring correction as follows: Page 1, first column, lines 16, 25 and 30, for the word "benzal" read benzyl; and that the said Letters Patent should be read with this correction therein that the same may conform to the record of the case in the Patent Office.

Signed and sealed this 6th day of December, A. D. 1938.

Henry Van Arsdale (Seal)      Acting Commissioner of Patents.

benzyl chloride, a water solution of sodium sulphide containing excess sulphur, and a solvent capable of dissolving dibenzyl disulphide, which solvent is not substantially miscible with water, conducting said reaction at elevated temperature with agitation until completion of the reaction, separating the phases, cooling the solvent to precipitate dibenzyl disulphide therefrom, and recovering the precipitate.

2. That process for the manufacture of dibenzyl disulphide which comprises the steps of reacting a non-homogeneous system composed of benzyl chloride, a water solution of sodium sulphide containing excess sulphur, and a solvent chosen from the group consisting of benzol, xylol, toluol, n-butyl alcohol, n-hexyl alcohol, cyclohexyl alcohol, n-butyl ether, normal amyl alcohol, and petroleum naphthas, conducting said reaction at elevated temperatures with agitation until completion of the reaction, separating the phases, cooling the solvent to precipitate dibenzyl disulphide therefrom, and recovering the precipitate.

3. That process for the manufacture of dibenzyl disulphide which comprises the steps of reacting a non-homogeneous system composed of benzyl chloride, a water solution of sodium sulphide containing excess sulphur, and a solvent capable of dissolving dibenzyl disulphide, which solvent is not substantially miscible with water, conducting said reaction at a temperature upwards of 50° C. with agitation until completion of the reaction, separating the phases, cooling the solvent to precipitate dibenzyl disulphide therefrom, and recovering the precipitate.

4. That process for the manufacture of dibenzyl disulphide which comprises the steps of reacting a non-homogeneous system composed of benzyl chloride, a water solution of sodium sulphide containing excess sulphur, and a solvent capable of dissolving dibenzyl disulphide, which solvent is not substantially miscible with water, conducting said reaction at a temperature upwards of 50° C. with agitation until completion of the reaction, while refluxing vaporized solvent to the reaction mixture, separating the phases, cooling the solvent to precipitate dibenzyl disulphide therefrom, and recovering the precipitate.

5. That process for the manufacture of dibenzyl disulphide which comprises the steps of reacting a non-homogeneous system composed of benzyl chloride and a water solution of sodium sulphide containing excess sulphur, conducting said reaction at elevated temperature with agitation until completion of the reaction, separating the phases, and recovering the product from the non-aqueous phase.

6. That process for the manufacture of dibenzyl disulphide which comprises the steps of reacting a non-homogeneous system composed of benzyl chloride and an aqueous solution of sodium sulphide containing excess sulphur, conducting the reaction at elevated temperature with agitation until completion of the reaction, extracting the dibenzyl disulphide from the reaction mixture with a solvent which is not substantially miscible with water, and recovering the dibenzyl disulphide from the solvent.

7. That process for the manufacture of dibenzyl disulphide which comprises the steps of reacting a non-homogeneous system composed of benzyl chloride and an aqueous solution of sodium sulphide containing excess sulphur, conducting the reaction at elevated temperature with agitation until completion of the reaction, extracting the dibenzyl disulphide from the reaction mixture with a solvent chosen from the group consisting of benzol, xylol, toluol, n-butyl alcohol, carbon tetrachloride, chloroform, ethylene dichloride, n-butyl ether, normal amyl alcohol, and petroleum naphthas, and recovering dibenzyl disulphide from the solvent.

8. That process for the manufacture of dibenzyl disulphide which comprises the steps of reacting a non-homogeneous system composed of benzyl chloride and an aqueous solution of sodium sulphide containing excess sulphur, conducting said reaction at a temperature upwards of 50° C. with agitation until completion of the reaction, extracting the dibenzyl disulphide from the reaction mixture with a solvent which is not substantially miscible with water, and recovering the dibenzyl disulphide from the solvent.

ROBERT C. MORAN.
GEORGE S. CRANDALL.

CERTIFICATE OF CORRECTION.

Patent No. 2,113,092.     April 5, 1938.

ROBERT C. MORAN, ET AL.

It is hereby certified that error appears in the printed specification of the above numbered patent requiring correction as follows: Page 1, first column, lines 16, 25 and 30, for the word "benzal" read benzyl; and that the said Letters Patent should be read with this correction therein that the same may conform to the record of the case in the Patent Office.

Signed and sealed this 6th day of December, A. D. 1938.

Henry Van Arsdale (Seal)                          Acting Commissioner of Patents.

CERTIFICATE OF CORRECTION.

Patent No. 2,113,092.                                          April 5, 1938.

ROBERT C. MORAN, ET AL.

It is hereby certified that error appears in the printed specification of the above numbered patent requiring correction as follows: Page 1, first column, lines 16, 25 and 30, for the word "benzal" read benzyl; and that the said Letters Patent should be read with this correction therein that the same may conform to the record of the case in the Patent Office.

Signed and sealed this 6th day of December, A. D. 1938.

Henry Van Arsdale (Seal)                                                Acting Commissioner of Patents.